(12) United States Patent
Terasaki et al.

(10) Patent No.: US 8,646,375 B2
(45) Date of Patent: Feb. 11, 2014

(54) FLUID PRESSURE CYLINDER WITH POSITION DETECTING DEVICE

(75) Inventors: Atsushi Terasaki, Tsukubamirai (JP); Kunihiro Suzuki, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 731 days.

(21) Appl. No.: 12/917,845

(22) Filed: Nov. 2, 2010

(65) Prior Publication Data

US 2011/0126703 A1 Jun. 2, 2011

(30) Foreign Application Priority Data

Nov. 30, 2009 (JP) ................ 2009-271662

(51) Int. Cl.
*F15B 15/14* (2006.01)
*F01B 31/12* (2006.01)

(52) U.S. Cl.
USPC ............................................... 92/5 R

(58) Field of Classification Search
USPC .................. 91/1; 92/5 R; 73/866.5
See application file for complete search history.

(56) References Cited

U.S. PATENT DOCUMENTS

| 6,520,065 B2 * | 2/2003 | Sakurai et al. ............ 92/5 R |
| 7,250,753 B2 | 7/2007 | Terasaki |
| 2002/0100336 A1 | 8/2002 | Sakurai |

FOREIGN PATENT DOCUMENTS

| JP | 2002-221204 | 8/2002 |
| JP | 2006-52744 | 2/2006 |

* cited by examiner

*Primary Examiner* — Edward Look
*Assistant Examiner* — Logan Kraft
(74) *Attorney, Agent, or Firm* — Oblon, Spivak, McClelland, Maier & Neustadt, L.L.P.

(57) ABSTRACT

An elongated attachment hole is formed on a housing containing a magnetic sensor, a thin plate-like hole cover is placed on the housing to cover the elongated attachment hole, a single attachment bolt is disposed in such a manner as to go through the hole cover and the elongated attachment hole, and the attachment bolt is screwed in a screw hole of a cylinder body, thereby fixation of the housing on the cylinder body and fixation of the hole cover on the housing are performed at the same time by using the single attachment bolt.

14 Claims, 5 Drawing Sheets

FLUID PRESSURE CYLINDER WITH POSITION DETECTING DEVICE

BACKGROUND OF THE INVENTION

1. Field of the Invention

The present invention relates to a fluid pressure cylinder with a position detecting device for detecting the position of a piston.

2. Description of the Related Art

In general, a fluid pressure cylinder has a piston slidingly moving along the inside of a cylinder bore and a piston rod connected to the piston. The cylinder is configured to perform various operations such as transporting, sorting or positioning of workpieces by moving the piston and piston rod to-and-from by the action of the pressure of a fluid supplied into and/or discharged from the cylinder bore. The cylinder is installed in automatic equipment in various fields.

In order to detect the position of the piston and use the detected signal as a control signal for automatic control, the cylinder is configured such that a magnetic sensor (position detecting device) is mounted on an outer surface of a cylinder body using slots and/or rails, etc., formed on the cylinder body, and the magnetic sensor senses the magnetism of a magnet mounted on the piston so as to detect the position of the piston, as shown, for example, in the Patent Documents, Japanese Unexamined Patent Application Publication No. 2002-221204 and Japanese Unexamined Patent Application Publication No. 2006-52744. Therefore, outer surfaces of the fluid pressure cylinder have a complex appearance including many irregularities because of the presence of the above-mentioned slots and/or rails as well as fittings and/or plural attachment bolts, etc., for mounting the magnetic sensor.

However, when irregularities such as slots and/or rails are formed on the outer surfaces of the fluid pressure cylinder, the cylinder is difficult to clean, and dust and/or dirt, etc., may easily collect and remain in the slots and/or rails. In particular, fluid pressure cylinders used for food processing machines are frequently washed using a washing fluid because of hygiene concerns regarding bacteria development caused by residual food, however, if irregularities such as slots and/or rails are formed on the outer surfaces of such cylinders, performance in terms of washing and drainage is diminished, and liquid and/or food debris may easily remain in recesses, behind projections and/or in corners, etc., so that much labor must be expended to remove them completely.

Therefore, fluid pressure cylinders, in particular, fluid pressure cylinders used for food processing machines, are required to have as few irregularities as possible on the outer surfaces, so that they have such a configuration that liquid and/or food, etc., may not easily remain on the surface in order to optimize cleaning in every corner with less cleaning man-hours and in order to obtain good performance in terms of drainage and wiping after washing. It is also important that the magnetic sensor be mounted simply using as few components as possible for facilitating the positioning and/or maintenance, etc., of the magnetic sensor.

However, the above-mentioned conventional fluid pressure cylinders cannot meet the demand satisfactorily because there are many irregularities on the outer surfaces thereof for mounting the position detecting device, and many components including plural attachment bolts are used for mounting the position detecting device.

BRIEF SUMMARY OF THE INVENTION

The invention aims to solve the above described problems existing in the prior art. The object of the invention is to facilitate the mounting of a position detecting device on a fluid pressure cylinder without using any slots and/or rails, etc., and with fewer components, so that the outer surface of the cylinder has fewer irregularities in order to improve the performance in terms of cleaning and drainage, and the positioning and/or maintenance, etc., of the position detecting device is facilitated.

In order to achieve the above object, a fluid pressure cylinder of the invention includes: a piston slidingly moving along the inside of a cylinder bore in the direction of the central axis by the action of fluid pressure; a piston rod connected to the piston; a magnet mounted on the piston; and a position detecting device mounted on a side surface of a cylinder body with an attachment bolt so that positioning thereof is possible, wherein the fluid pressure cylinder is configured in such a manner that the position detecting device detects the position of the piston by detecting the magnet. The fluid pressure cylinder is characterized in that the position detecting device has: a magnetic sensor that senses the magnetism of the magnet; a housing containing the magnetic sensor; an elongated attachment hole formed on the housing with the major axis thereof being parallel to the central axis; a hole cover disposed on an outer surface of the housing in such a manner as to cover the elongated attachment hole; and the single attachment bolt going through the hole cover and the elongated attachment hole, wherein fixation of the housing on the cylinder body and fixation of the hole cover on the housing are performed at the same time by screwing the single attachment bolt into a screw hole formed on a side surface of the cylinder body.

According to the invention, the attachment bolt is preferably engaged with the housing a retaining ring so that the attachment bolt, the housing and the hole cover are integrated so as to be inseparable.

According to one preferable aspect of the invention, a pin is fixed onto a side surface of the cylinder body, and the pin fits in the elongated attachment hole at a position adjacent to the attachment bolt in the direction of the central axis so that the housing is prevented from rotating on the attachment bolt.

Further, the hole cover has a projection fitted into the elongated attachment hole, and the projection prevents the hole cover from rotating on the attachment bolt.

According to another preferable aspect of the invention, the side surface of the cylinder body is formed as a convex surface curving in the peripheral direction of the cylinder body, and a bottom surface of the housing abutting the cylinder body is formed as a concave surface complementing the convex surface, so that the abutment between the convex surface and the concave surface prevents the housing from rotating on the attachment bolt.

In this case, a top surface of the housing is formed as a convex surface and the hole cover abutting the housing is curved in a convex shape so that the hole cover is prevented from rotating on the attachment bolt.

Further in the invention, gaskets are provided between the housing and the cylinder body, between the housing and the hole cover, and between a washer engaged by a head part of the attachment bolt and the hole cover, respectively, so that liquids are prevented from entering the inside of the position detecting device.

According to the invention, the housing containing the magnetic sensor can be mounted on the side surface of the fluid pressure cylinder without using slots and/or rails, etc., so that the outer surface of the cylinder has fewer irregularities than a conventional equivalent and the irregularities are simplified in shape. As a result, the cylinder is easy to wash and has good performance in terms of drainage and wiping so that fewer contaminants such as liquid remain after washing. Furthermore, fixation of the housing to the cylinder and fixation of the hole cover to the housing is achieved using the single attachment bolt, allowing the position detecting device to be attached simply on the side surface of the cylinder using less components, and the positioning and/or maintenance, etc., to be facilitated.

DETAILED DESCRIPTION OF THE INVENTION

Figure 1:
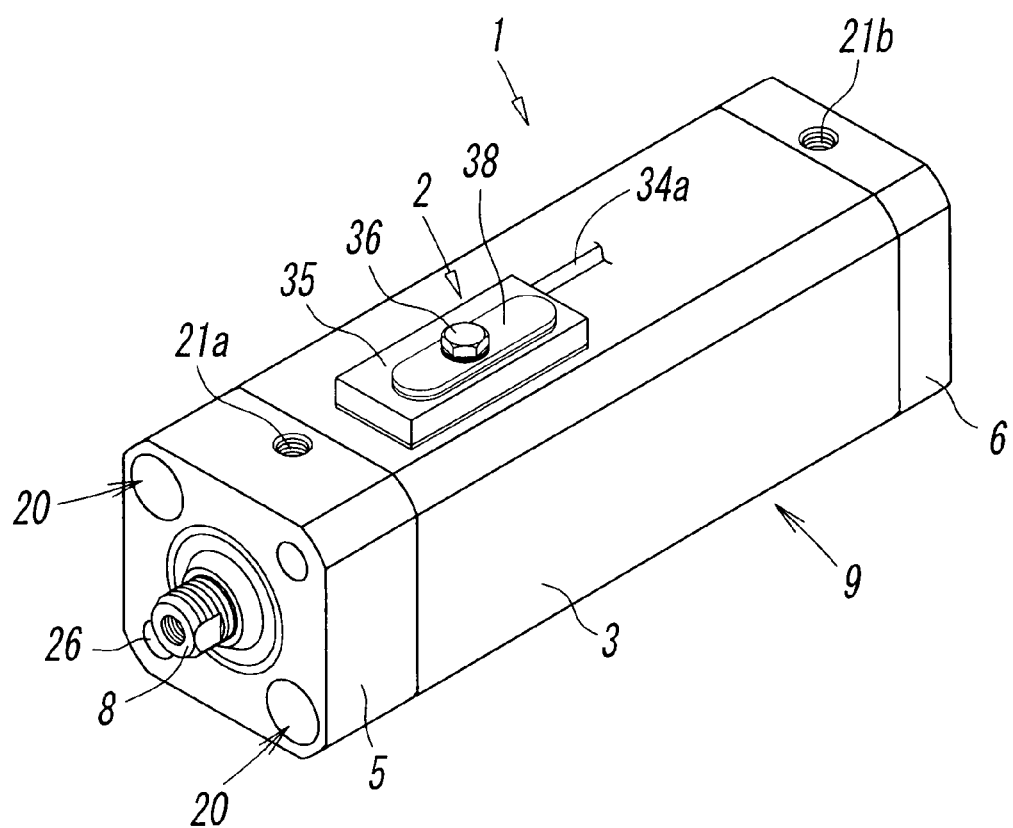
FIG. 1 is a perspective view showing a first embodiment of a fluid pressure cylinder according to the invention.

FIGS. 1 to 4 show a first embodiment of the invention, and the reference numeral 1 in the figures indicates a fluid pressure cylinder, and the reference numeral 2 indicates a position detecting device mounted on an outer surface of the fluid pressure cylinder.

The fluid pressure cylinder 1 has a cylinder body 3 with a substantially rectangular cross section having a round cylinder bore 4 therein, a rod cover 5 and a head cover 6 with a substantially rectangular cross section covering the respective ends of the cylinder bore 4, a piston 7 slidingly moving in the cylinder bore 4 in the direction of the central axis L of the cylinder bore 4, and a piston rod 8 slidingly going through the rod cover 5 with the base end thereof connected to the piston 7. Four corner parts on the periphery of the cylinder body 3 and the rod cover 5 and the head cover 6 are chamfered so as to form planar surfaces or convex-shaped outwardly curved surfaces.

On the outer circumference of the piston 7, a piston packing 11 is mounted so as to seal between the outer circumference of the piston and the inner circumference of the cylinder bore 4. In addition, on the inner circumference of a rod insertion hole 12 in the rod cover 5, there are provided a rod packing 13 sealing between the rod cover 5 and the piston rod 8, a slide bearing 14 guiding the piston rod 8, and a scraper 15 to scrape off contaminants stuck on the outer circumference of the piston rod 8, and a space 16 serving as a grease reservoir is defined and formed by the scraper 15.

The rod cover 5, the head cover 6 and the cylinder body 3 are made of aluminum alloy, for example, and formed so as to have the same cross-sectional shape and dimensions, and are abutted closely so as to not create any gap or unevenness therebetween, and are connected to each other with connection bolts 20 disposed on opposing corners on the respective end surfaces of the rod cover 5 and head cover 6. Thus, a square pole-shaped cylinder housing 9 having four side surfaces on the periphery is formed by the cylinder body 3, the rod cover 5 and the head cover 6. The outer surfaces, i.e., four side surfaces, of the cylinder housing 9 are formed as flat surfaces with no irregularities except the part of the cylinder body 3 where the position detecting device 2 is mounted and the part where respective ports 21a, 21b of the rod cover 5 and the head cover 6 are formed.

The reference numeral 23 in the figures indicates a seal member disposed between the outer circumference of an insert part 5a of the rod cover 5 and the inner circumference of the cylinder body 3, and the reference numeral 24 indicates a seal member disposed between the outer circumference of the insert part 6a of the head cover 6 and the inner circumference of the cylinder body 3.

Screw holes 26 are provided diagonally at positions 90° with respect to the connection bolts 20 on the end surface of the rod cover 5, and the screw holes 26 allow the fluid pressure cylinder 1 to be mounted at a predetermined position. The screw holes 26 may be provided on the end surface of the head cover 6, or on both end surfaces of the rod cover 5 and the head cover 6. When the screw holes 26 are provided on the both end surfaces, they can be formed so as to go through the rod cover 5, the cylinder body 3 and the head cover 6.

Further, the fluid pressure cylinder 1 has a rod-side pressure chamber 27a formed between the piston 7 and the rod cover 5, a head-side pressure chamber 27b formed between the piston 7 and the head cover 6, and a rod-side port 21a and a head-side port 21b formed in the rod cover 5 and the head cover 6, respectively, so as to supply/discharge a pressure fluid into/from the pressure chambers 27a, 27b, respectively. The pressure chambers 27a, 27b and respective ports 21a, 21b are in communication with each other through communication paths 28a, 28b formed in the rod cover 5 and the head cover 6, respectively.

Thus, when the pressure fluid is supplied to the rod-side pressure chamber 27a from the rod-side port 21a and the pressure fluid in the head-side pressure chamber 27b is discharged from the head-side port 21b toward the outside, the piston 7, together with the piston rod 8, travels to a back stroke end (see FIG. 2) at the head cover 6 side. In turn, when the pressure fluid is supplied into the head-side pressure chamber 27b from the head-side port 21b and the pressure fluid in the rod-side pressure chamber 27a is discharged from the rod-side port 21a toward the outside, the piston 7, together with the piston rod 8, travels to a front stroke end at the opposite side.

The reference numeral 29 in the figures is a damper provided on an end surface of the piston 7 for absorbing the impact and noise by abutting to the head cover 6 when the piston 7 travels to the back stroke end. Such a damper may also be provided on the rod cover side.

In the fluid pressure cylinder 1, in order to detect the position of the piston 7, a ring-shaped magnet 32 is mounted on the outer circumference of the piston 7 and the position detecting device 2 is mounted on a side surface 3a of the cylinder body 3. The magnet 32 is magnetized so that one end thereof in the direction of the central axis L has the north magnetic pole and the other end has the south magnetic pole. However, the magnet may be magnetized so as to have the north and south poles in a radial direction.

The position detecting device 2 contains in a liquid-tight manner an elongated stick-like magnetic sensor 34 that senses the magnetism of the magnet 32 in the housing 35 made of non-magnetic material such as aluminum alloy, stainless steel or synthetic resin. The housing 35 is fixed on the side surface 3a of the cylinder body 3 using a single attachment bolt 36 so that the positioning thereof is possible in the direction of the central axis L.

In the example shown in the figures, in order to detect the piston 7 at the front stroke end, the position detecting device 2 is mounted at a position close to the front end of the cylinder body 3.

Figure 5:
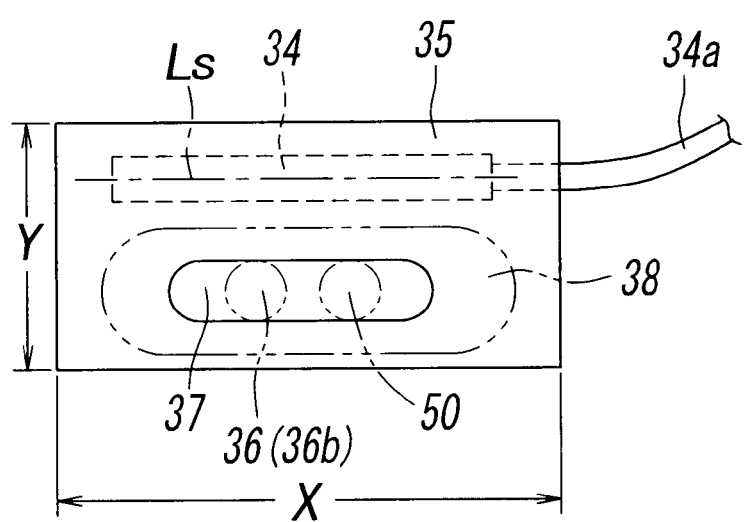
FIG. 5 is a plan view of a housing.

The housing 35, as seen in FIG. 5, is made of a member having a flat hexagonal shape elongated in the direction of the central axis L. The outer surfaces of the housing 35, that is, five surfaces except a bottom surface 35*a* abutting the side surface of the cylinder body 3 are formed as flat surfaces without irregularities, except the part on the top surface where an elongated attachment hole 37 is formed. The magnetic sensor 34 is contained in the housing 35 at a position close to one end of the housing in the minor axis direction Y (crosswise direction) with the sensor axis Ls thereof being in the major axis direction X (longitudinal direction) of the housing 35, that is, being parallel with the central axis L. This magnetic sensor 34 has magnetic detection directivity in the direction that the sensor axis Ls lies in parallel with the central axis L.

In the example shown in the figures, the thickness t of the housing 35 is smaller than the length in the direction of the minor axis Y, but the thickness may be the same as the length in the direction of the minor axis. Each corner part of the outer surface of the housing 35 may be chamfered so as to form a flat or curved surface.

Furthermore, the entire housing 35 is formed integrally from a single member, but the housing 35 may be formed by combining multiple members together and contain the magnetic sensor 34 within the members in a liquid-tight manner.

The shape of the housing 35 seen in plan may be an ellipse shape elongated in the direction of the central axis L or a similar shape.

At a position close to the other end of the housing 35 in the minor axis direction Y, the elongated attachment hole 37, through which the attachment bolt 36 is inserted, is formed adjacent to the magnetic sensor 34 with the major axis thereof being in parallel with the sensor axis Ls (thus, with the central axis L). An elongated and flat sheet-like hole cover 38 is disposed on a top surface 35*b* of the housing 35 for closing the top part of the elongated attachment hole 37. Then, from the top of the hole cover 38 and through a washer 41, the attachment bolt 36 is inserted through a bolt insertion hole and the elongated attachment hole 37 of the hole cover 38. A threaded portion 36*c* on the tip part of the attachment bolt 36 is screwed in a screw hole 42 formed on the side surface 3*a* of the cylinder body 3, and thus the attachment bolt 36 serves to fix the housing 35 on the cylinder body 3 and to fix the hole cover 38 on the housing 35 at the same time.

Figure 3:
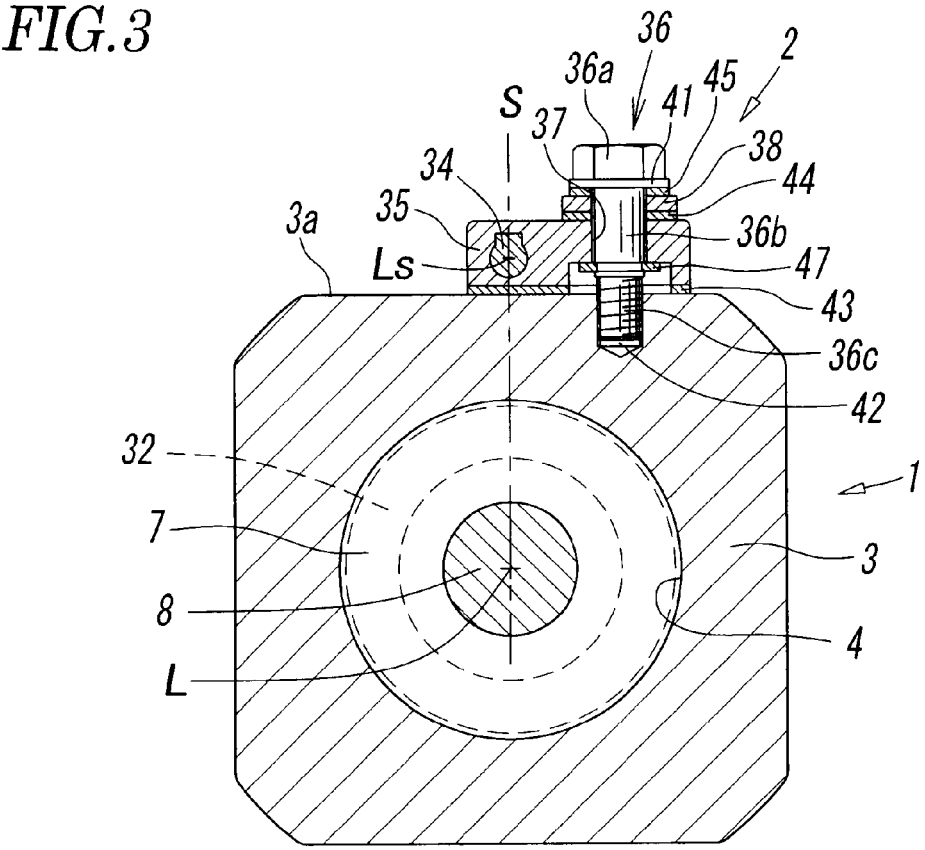
FIG. 3 is an enlarged sectional view taken along III-III line in FIG. 2.
Figure 4:
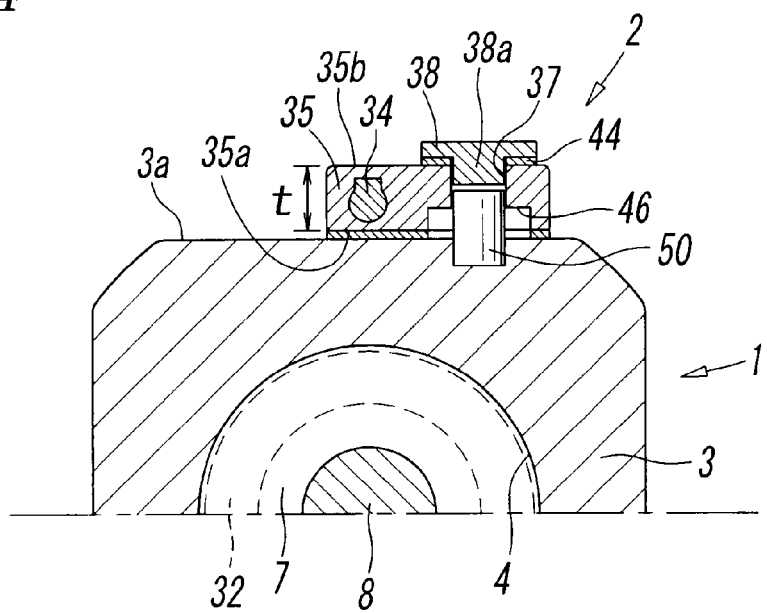
FIG. 4 is an enlarged sectional view taken along IV-IV line in FIG. 2.

Then, as shown in FIG. 3, the magnetic sensor 34 is placed on the side surface 3*a* of the cylinder body 3 with the sensor axis Ls located on a virtual surface S lying vertically and including the central axis L, so that the magnetic sensor 34 has the best position and orientation for sensing the magnetism of the magnet 32. Therefore, the position of the screw hole 42 in which the attachment bolt 36 is screwed is located at a position close to the end part of the side surface 3*a* on the cylinder body 3 in accordance with the position of the magnetic sensor 34. The reference numeral 34*a* in FIG. 1 indicates a lead wire extending from the magnetic sensor 34.

Furthermore, a first gasket 43 is disposed between the bottom surface 35*a* of the housing 35 and the side surface 3*a* of the cylinder body 3, a second gasket 44 is disposed between the top surface 35*b* of the housing 35 and the bottom surface of the hole cover 38, and a third gasket 45 is disposed between the bottom surface of the washer 41 and the top surface of the hole cover 38, thus, liquids are completely prevented from entering the housing 35 via the gaskets 43, 44, 45.

By choosing a chemically resistant material for the gaskets, washing with chemicals will also be possible.

The attachment bolt 36 has a head part 36*a* engaging the washer 41, a shank 36*b* fitting in the elongated attachment hole 37, and a threaded portion 36*c* on the tip part screwed in the screw hole 42. The attachment bolt 36 engages the bottom surface of the housing 35 in a recess 46 formed on the bottom surface of the housing 35 using a retaining ring 47 formed as an E ring, thus the housing 35, the hole cover 38 and the washer 41 are integrated to be inseparable by the attachment bolt 36. In addition, the second gasket 44 and the third gasket 45 are also inseparable because of the attachment bolt 36 going through them. Therefore, during the maintenance of the position detecting device 2, when the housing 35 is removed from the cylinder body 3 by detaching the attachment bolt 36 from the screw hole 42, there is no risk of dropping and losing the attachment bolt, the hole cover 38 and/or the washer 41, etc.

The positioning of the housing 35 is performed by loosening the attachment bolt 36 so as not to be detached from the screw hole 42, then, while maintaining this state, moving the housing 35 together with the first gasket 43 in the major axis direction of the elongated attachment hole 37, followed by tightening the attachment bolt 36. At this point, since the hole cover 38 is engaged with the attachment bolt 36, the hole cover 38 stays at the original position together with the second gasket 44, and is not moved together with the housing 35.

Figure 2:
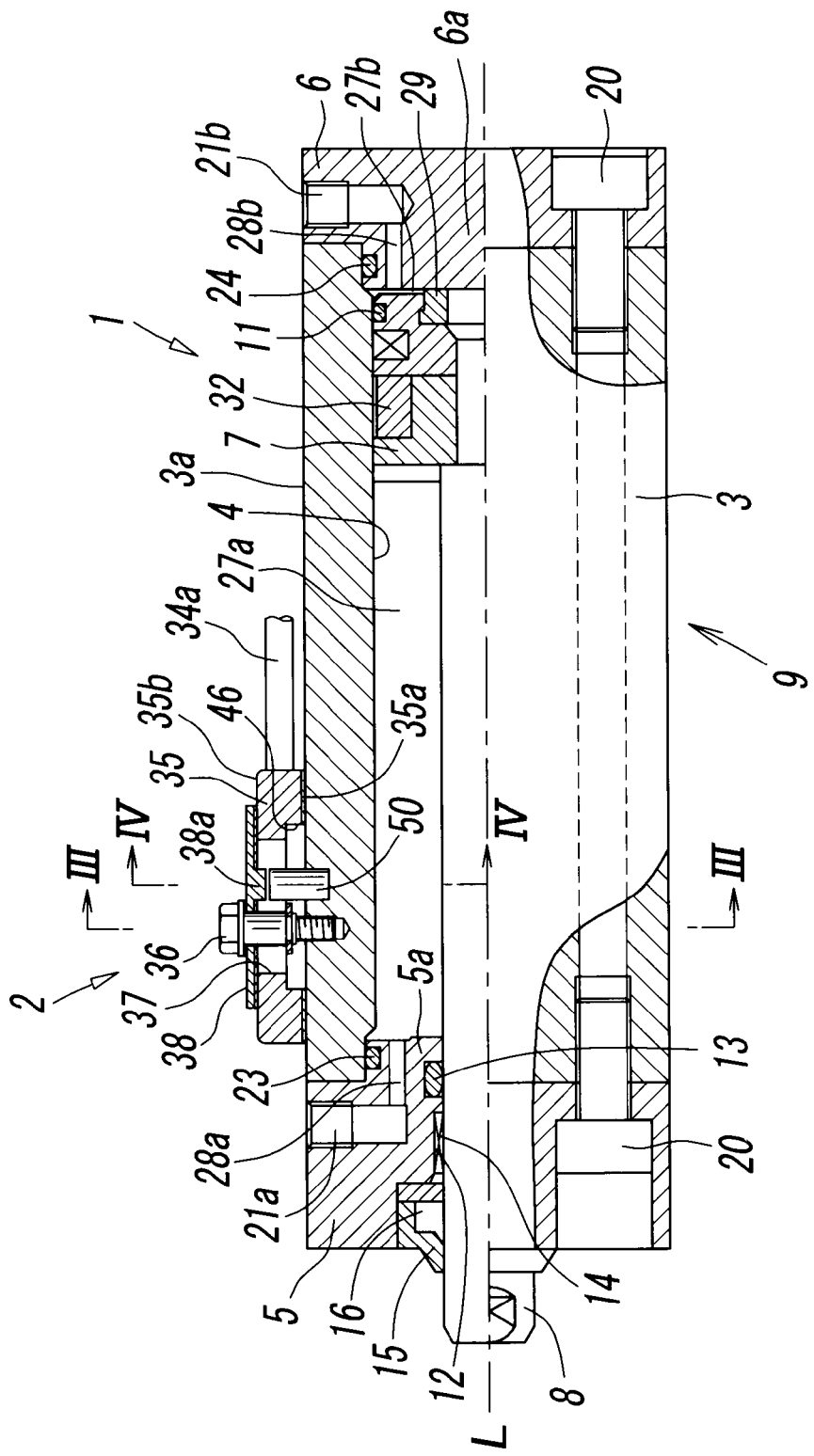
FIG. 2 is a longitudinal sectional view of FIG. 1.

In this way, the position of the housing 35 can be adjusted in the major axis direction of the elongated attachment hole 37. In FIG. 2, the range through which the housing 35 can be moved is between a position, to the right, where the left end wall of the elongated attachment hole 37 abuts the attachment bolt 36, and a position, to the left, where the right end wall of the elongated attachment hole 37 abuts a pin 50. Further, the hole cover 38 is formed in such a size that, even when the housing 35 is moved by the maximal amount in either the right or left direction, the hole cover 38 does not protrude out of the housing 35, and can cover the elongated attachment hole 37 completely.

In order to prevent the housing 35 from rotating on the attachment bolt 36 when the attachment bolt 36 is tightened to fix the housing 35 and/or when the positioning of the housing 35 is performed, the pin 50 is fixed at the position adjacent to the screw hole 42 on the side surface 3*a* of the cylinder body 3, and the pin 50 is fitted into the elongated attachment hole 37. The pin 50 and the screw hole 42 (thus, the attachment bolt 36) are arranged in the direction along the central axis L, i.e., in the direction along the major axis of the elongated attachment hole 37, thereby the pin 50 functions as a guide during the positioning of the housing 35 in addition to having a function of preventing the housing 35 from turning. As a result of providing the pin 50, the housing 35, i.e., the magnetic sensor 34, can always be fixed precisely in a specific predetermined orientation.

In addition, in order to prevent the hole cover 38 from rotating on the attachment bolt 36, a projection 38*a* is integrally formed on the bottom surface of the hole cover 38, and this projection 38*a* is fitted into the elongated attachment hole 37. The projection 38*a* is formed to be concentric with the pin 50 at a position vertically opposite the pin 50. Thereby, the hole cover 38 is prevented from moving out of the position of the elongated attachment hole 37 and avoiding the attachment hole 37 exposed.

The diameter of the shank 36*b* of the attachment bolt 36 and the diameter of the pin 50 are precision-finished so as to be minimally smaller than the minor axis of the elongated attachment hole 37. Thereby, displacement of the housing 35 with respect to the attachment bolt 36 and the pin 50 in the minor axis Y direction is very small, and thus, the accuracy with which the housing 35 is fixed using the attachment bolt 36 and accuracy with which the housing 35 is prevented from turning using the pin 50 are improved, allowing the housing 35, i.e., the magnetic sensor 34, to be fixed precisely in a specific orientation.

Meanwhile, the projection 38a formed on the cover is not necessarily finished as precisely as the shank 36b of the attachment bolt 36 and the pin 50 with respect to the dimensional relationship with the elongated attachment hole 37.

The fluid pressure cylinder 1 having the above configuration is installed in various types of automatic equipment, particularly food processing machines, and performs various operations such as transporting or sorting of products. In operations, starting from the state shown in FIG. 2, when the pressure fluid is supplied through the head-side port 21b to the head-side pressure chamber 27b and the pressure fluid in the rod-side pressure chamber 27a is discharged through the rod-side port 21a toward the outside, the piston 7 and piston rod 8 are advanced to the left in FIG. 2. Then, upon the arrival or immediately before the arrival of the piston 7 at the front stroke end, the magnetism of the magnet 32 mounted on the piston 7 is sensed by the magnetic sensor 34 for position detection, and then the detected signal is inputted into a control unit, not shown, through the lead wire 34a and used as a control signal.

On reversing the charging/discharging of the pressure fluid, the piston 7 and the piston rod 8 are moved to the right and retracted to the position shown in FIG. 2. While retracting, the position detection of the piston 7 by the magnetic sensor 34 is not performed.

However, if the position detecting device 2 is mounted at a position close to the back end of the cylinder body 3, the position of the piston 7 can be detected at the back stroke end, and if the position detecting device 2 is mounted at both a position close to the front end and a position close to the back end of the cylinder body 3, the position of the piston 7 can be detected at both the front stroke end and the back stroke end.

Further, the fluid pressure cylinder 1 has good performance in terms of washing with a washing fluid after operation thereof has finished. That is to say, in the fluid pressure cylinder 1, the magnetic sensor 34 is contained in the flat-shaped housing 35 without irregularities, and the housing 35 is fixed with the single attachment bolt 36 at the screw hole 42 formed on the flat side surface 3a of the cylinder body 3, thereby, there are fewer irregularities and the irregularities have a simple shape on the outer surface of the cylinder so as to have as few parts as possible where residual liquid can remain, compared to a conventional cylinder with a magnetic sensor which is mounted using rails and/or slots, etc., provided on the cylinder body. This results in ease of washing of the outer surface of the cylinder, a good performance in terms of drainage and wiping, and fewer contaminants such as liquid or food remaining stuck after washing.

Furthermore, because the position detecting device 2 is mounted on the cylinder body 3 with the single attachment bolt 36, it is only necessary to tighten/loosen and/or remove one attachment bolt 36, allowing simple operations such as the positioning and/or mounting/demounting of the position detecting device 2 to be carried out.

In the above embodiment, the screw hole 42 and the pin 50 are provided on only one side surface among four side surfaces 3a of the cylinder body 3 and the position detecting device 2 is mounted only on this side surface. However, the screw hole 42 and the pin 50 may be provided on plural side surfaces so that the position detecting device 2 can be selectively mounted on a required side surface. In this case, unused screw holes 42 and pins 50 are preferably covered with flat covers with no irregularities outside, similar to the housing 35, so that performance in terms of drainage and wiping during washing is not impaired.

Figure 6:
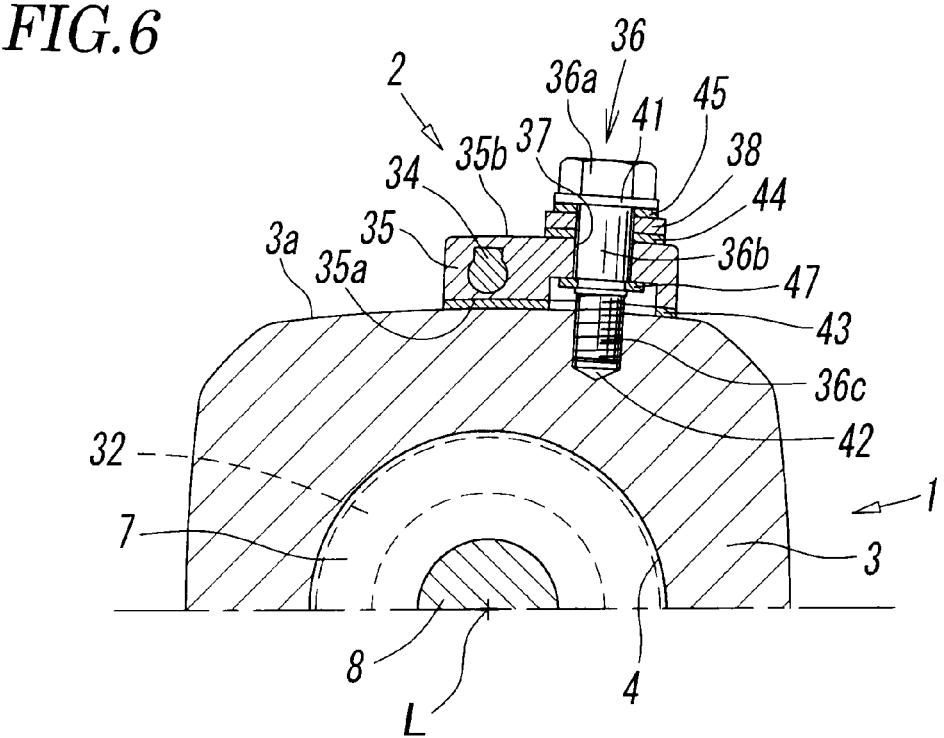
FIG. 6 is a partial sectional view taken at a corresponding position as in FIG. 3, showing a second embodiment of the fluid pressure cylinder according to the invention.

Also in the above first embodiment, four side surfaces on the periphery of the cylinder housing 9, thus, four side surfaces 3a on the periphery of the cylinder body 3 are formed as flat surfaces planar both in the peripheral direction of the cylinder body 3 and in the direction of the central axis L, and the bottom surface 35a and the top surface 35b of the housing 35 are also formed as similar flat surfaces. However, as in a second embodiment shown in FIG. 6, the four side surfaces 3a of the cylinder body 3 may be formed as outwardly curved surfaces in a convex shape curving in the peripheral direction of the cylinder body 3, and the bottom surface 35a and the top surface 35b of the housing 35 can be formed as curved surfaces curving in the same direction as the side surfaces 3a.

In this case, the bottom surface 35a of the housing 35 is curved in a concave shape in the crosswise direction and the top surface 35b is curved in a concave shape in the crosswise direction, then, the entire hole cover 38 is also formed so as to curve outwardly in a convex shape corresponding to the curved shape of the top surface 35b. Although not shown in the figures, it is needless to say that the side surfaces of the rod cover 5 and the head cover 6 are also formed as curved surfaces similar to the side surfaces 3a of the cylinder body 3.

Because the configuration in this second embodiment is substantially the same as that in the first embodiment, the identical fundamental components are referred to using the same reference numerals as in the first embodiment and the descriptions thereof are omitted.

By configurating the fluid pressure cylinder as in the second embodiment, liquid easily flows down the side surfaces 3a of the cylinder body 3 and the top surface 35b of the housing 35 after washing, thus the performance in terms of drainage is further improved.

Furthermore, as in the second embodiment, when the side surfaces 3a of the cylinder body 3, the bottom surface 35a and top surface 35b of the housing 35, and the hole cover 38 are formed as curved surfaces, the engagement of the concave bottom surface 35a of the housing 35 and the convex side surface 3a of the cylinder body 3 allows less misalignment of the housing 35 in the crosswise direction to occur. In other words, the housing 35 is prevented from rotating on the attachment bolt 36, and the side surface 3a of the cylinder body 3 formed as a convex curved surface and the bottom surface 35a of the housing 35 formed as a concave curved surface serve to function as anti-turning means.

The same thing happens in the housing 35 and the hole cover 38. That is, abutment of the top surface 35b of the housing 35 curved in a convex shape and the hole cover 38 curved in the same direction as the top surface 35b prevents the hole cover 38 from rotating on the attachment bolt 36.

Figure 7:
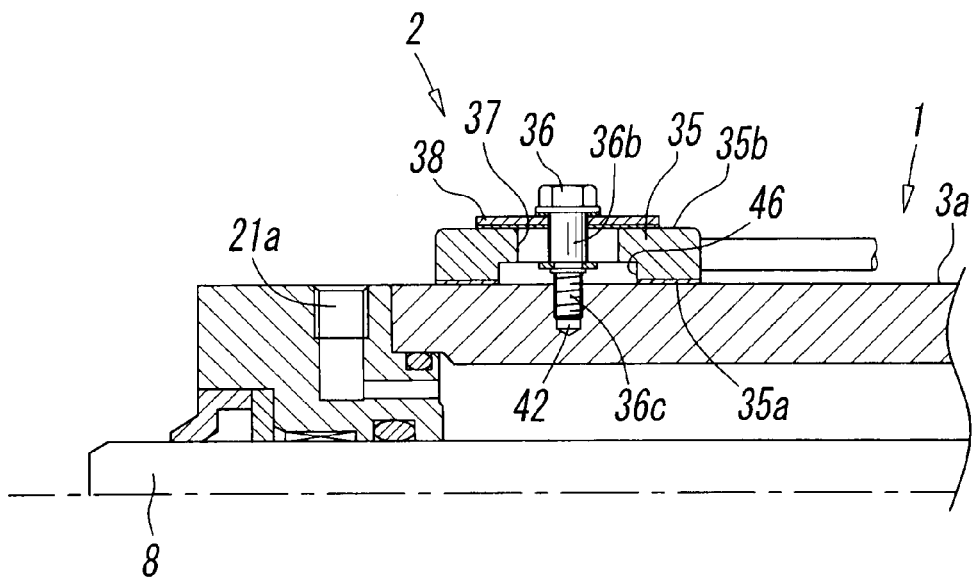
FIG. 7 is a partial sectional view taken at a corresponding position as in FIG. 2, showing a third embodiment of the fluid pressure cylinder according to the invention.

Therefore, in this case, it is not necessary to provide the pin 50 and the projection 38a to prevent turning shown in FIG. 2. In turn, as in a third embodiment shown in FIG. 7, it is only necessary to bring the housing 35 to abut against the side surface 3a of the cylinder body 3 with no above-mentioned pin being provided, and bring the hole cover 38 without the projection to abut against the top surface 35b of the housing 35, and then, while holding them together, tighten the housing 35 and the hole cover 38 together using the attachment bolt 36.

Because the configuration in this third embodiment is substantially same as that in the first embodiment, the identical fundamental components are referred to using the same reference numerals as in the first embodiment and the descriptions thereof are omitted.

The invention claimed is:

1. A fluid pressure cylinder comprising: a piston slidingly moving along the inside of a cylinder bore in the direction of a central axis by the action of fluid pressure; a piston rod connected to the piston; a magnet mounted on the piston; and a position detecting device mounted on an outer surface of a cylinder body with a single attachment bolt so that positioning thereof is possible, wherein the fluid pressure cylinder is configured in such a manner that the position detecting device detects the position of the piston by detecting the magnet, wherein the position detecting device has: a magnetic sensor that senses the magnetism of the magnet; a housing containing the magnetic sensor; an elongated attachment hole formed on the housing with a major axis thereof being parallel to the central axis; a hole cover disposed on an outer surface of the housing in such a manner as to cover the elongated attachment hole; and the single attachment bolt going through the hole cover and the elongated attachment hole, wherein fixation of the housing on the cylinder body and fixation of the hole cover on the housing are simultaneously performed by screwing the single attachment bolt into a screw hole formed on a side surface of the cylinder body.

2. The fluid pressure cylinder according to claim 1, wherein the attachment bolt is engaged with the housing a retaining ring so that the attachment bolt, the housing and the hole cover are integrated so as to be inseparable.

3. The fluid pressure cylinder according to claim 2, wherein a pin is fixed onto a side surface of the cylinder body, and the pin fits in the elongated attachment hole at a position adjacent to the attachment bolt in the direction of the central axis so that the housing is prevented from rotating on the attachment bolt.

4. The fluid pressure cylinder according to claim 3, wherein the hole cover has a projection fitted into the elongated attachment hole, and the projection prevents the hole cover from rotating on the attachment bolt.

5. The fluid pressure cylinder according to claim 2, wherein the side surface of the cylinder body is formed as a convex surface curving in the peripheral direction of the cylinder body, and a bottom surface of the housing abutting the cylinder body is formed as a concave surface complementing the convex surface, so that an abutment between the convex surface and the concave surface prevents the housing from rotating on the attachment bolt.

6. The fluid pressure cylinder according to claim 5, wherein a top surface of the housing is formed as a convex surface and the hole cover abutting the housing is curved in a convex shape so that the hole cover is prevented from rotating on the attachment bolt.

7. The fluid pressure cylinder according to claim 2, wherein gaskets are provided between the housing and the cylinder body, between the housing and the hole cover, and between a washer engaged by a head part of the attachment bolt and the hole cover, respectively, so that liquids are prevented from entering the inside of the position detecting device.

8. The fluid pressure cylinder according to claim 1, wherein a pin is fixed onto a side surface of the cylinder body, and the pin fits in the elongated attachment hole at a position adjacent to the attachment bolt in the direction of the central axis so that the housing is prevented from rotating on the attachment bolt.

9. The fluid pressure cylinder according to claim 8, wherein the hole cover has a projection fitted into the elongated attachment hole, and the projection prevents the hole cover from rotating on the attachment bolt.

10. The fluid pressure cylinder according to claim 8, wherein gaskets are provided between the housing and the cylinder body, between the housing and the hole cover, and between a washer engaged by a head part of the attachment bolt and the hole cover, respectively, so that liquids are prevented from entering the inside of the position detecting device.

11. The fluid pressure cylinder according to claim 1, wherein the side surface of the cylinder body is formed as a convex surface curving in the peripheral direction of the cylinder body, and a bottom surface of the housing abutting the cylinder body is formed as a concave surface complementing the convex surface, so that an abutment between the convex surface and the concave surface prevents the housing from rotating on the attachment bolt.

12. The fluid pressure cylinder according to claim 11, wherein a top surface of the housing is formed as a convex surface and the hole cover abutting the housing is curved in a convex shape so that the hole cover is prevented from rotating on the attachment bolt.

13. The fluid pressure cylinder according to claim 11, wherein gaskets are provided between the housing and the cylinder body, between the housing and the hole cover, and between a washer engaged by a head part of the attachment bolt and the hole cover, respectively, so that liquids are prevented from entering the inside of the position detecting device.

14. The fluid pressure cylinder according to claim 1, wherein gaskets are provided between the housing and the cylinder body, between the housing and the hole cover, and between a washer engaged by a head part of the attachment bolt and the hole cover, respectively, so that liquids are prevented from entering the inside of the position detecting device.

* * * * *